(12) United States Patent
Koo et al.

(10) Patent No.: US 12,409,546 B2
(45) Date of Patent: Sep. 9, 2025

(54) MOBILE ROBOT APPARATUS

(71) Applicant: SAMSUNG ELECTRONICS CO., LTD., Suwon-si (KR)

(72) Inventors: Donghan Koo, Suwon-si (KR); Sangmin Hyun, Suwon-si (KR); Yongtae Kim, Suwon-si (KR); Junggap Kuk, Suwon-si (KR); Kuyoung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 327 days.

(21) Appl. No.: 18/077,003

(22) Filed: Dec. 7, 2022

(65) Prior Publication Data
US 2023/0098075 A1 Mar. 30, 2023

Related U.S. Application Data

(63) Continuation of application No. PCT/KR2021/008303, filed on Jun. 30, 2021.

(30) Foreign Application Priority Data

Jul. 15, 2020 (KR) ........................ 10-2020-0087366
Nov. 2, 2020 (KR) ........................ 10-2020-0144675

(51) Int. Cl.
*B25J 5/00* (2006.01)
*B25J 9/10* (2006.01)
(Continued)

(52) U.S. Cl.
CPC ............. *B25J 5/007* (2013.01); *B25J 9/1035* (2013.01); *B25J 9/126* (2013.01); *B25J 9/1664* (2013.01); *B25J 13/089* (2013.01); *B25J 19/021* (2013.01)

(58) Field of Classification Search
CPC . B25J 5/007; B25J 9/126; B25J 9/1035; B25J 9/102; B25J 19/023; B25J 5/00
See application file for complete search history.

(56) References Cited

U.S. PATENT DOCUMENTS

| | | | |
|---|---|---|---|
| 7,468,592 B2 | 12/2008 | Lim et al. | |
| 9,532,690 B2 | 1/2017 | Jang et al. | |
| 10,168,715 B2 | 1/2019 | Tsuji et al. | |
| 10,307,911 B2* | 6/2019 | Higuchi | B25J 9/1697 |
| 10,507,400 B2 | 12/2019 | Higuchi | |

(Continued)

FOREIGN PATENT DOCUMENTS

| | | |
|---|---|---|
| JP | 61-11082 A | 1/1986 |
| JP | 2008-272859 A | 11/2008 |

(Continued)

OTHER PUBLICATIONS

Communication issued on Oct. 27, 2023 by European Patent Office in European Patent Application No. 21842616.1.

(Continued)

*Primary Examiner* — Dalena Tran
(74) *Attorney, Agent, or Firm* — Sughrue Mion, PLLC

(57) ABSTRACT

A mobile robot apparatus is provided. The mobile robot apparatus includes: a body; a first wheel disposed at a first side surface of the body; a second wheel disposed at a second side surface of the body opposite to the first side surface; a first drive device configured to provide a driving force to each of the first wheel and the second wheel; a second drive device configured to move the body in a vertical direction relative to at least one of a first center axis of the first wheel and a second center axis of the second wheel; and a processor configured to control the second drive device to move the body to contact a surface on which the mobile robot apparatus is disposed, or move the body away from the surface on which the mobile robot apparatus is disposed.

14 Claims, 17 Drawing Sheets

(51) Int. Cl.
*B25J 9/12* (2006.01)
*B25J 9/16* (2006.01)
*B25J 13/08* (2006.01)
*B25J 19/02* (2006.01)

(56) References Cited

U.S. PATENT DOCUMENTS

| | | | |
|---|---|---|---|
| 10,799,806 B2 * | 10/2020 | Sasagawa | G01P 15/18 |
| 2004/0182614 A1 | 9/2004 | Wakui | |
| 2007/0132420 A1 | 6/2007 | Lim et al. | |
| 2007/0215494 A1 * | 9/2007 | Yuhara | A45D 33/006 206/37 |
| 2008/0084175 A1 * | 4/2008 | Hollis | G05D 1/0891 901/1 |
| 2015/0105940 A1 | 4/2015 | Takase | |
| 2015/0208891 A1 | 7/2015 | Jang et al. | |
| 2019/0015758 A1 | 1/2019 | Higuchi | |
| 2019/0384325 A1 | 12/2019 | Lee et al. | |
| 2020/0070923 A1 | 3/2020 | Roufas | |
| 2020/0180141 A1 | 6/2020 | Dong | |
| 2020/0262053 A1 | 8/2020 | Clerc | |

FOREIGN PATENT DOCUMENTS

| | | |
|---|---|---|
| JP | 2010-264555 A | 11/2010 |
| JP | 2019-18276 A | 2/2019 |
| KR | 2001-0089835 A | 10/2001 |
| KR | 10-0783134 B1 | 12/2007 |
| KR | 10-2011-0108103 A | 10/2011 |
| KR | 10-2011-0132745 A | 12/2011 |
| KR | 10-2018-0083398 A | 7/2018 |
| KR | 10-1912806 B1 | 10/2018 |
| KR | 10-1984012 B1 | 5/2019 |
| KR | 10-2020-0025102 A | 3/2020 |
| KR | 10-2125334 B1 | 6/2020 |

OTHER PUBLICATIONS

S. Kim and S. Kwon, "Nonlinear Optimal Control Design for Underactuated Two-Wheeled Inverted Pendulum Mobile Platform", IEEE/ASME Transactions on Mechatronics, vol. 22, No. 6, Dec. 2017, pp. 2803-2808, (6 pages total).

Written Opinion (PCT/ISA/237) issued Oct. 18, 2022 by the International Searching Authority in International Application No. PCT/KR2021/008303.

International Search Report (PCT/ISA/210) issued Oct. 18, 2021 by the International Searching Authority in International Application No. PCT/KR2021/008303.

Communication dated Apr. 2, 2025, issued by Korean Intellectual Property Office in Korean Patent Application No. 10-2020-0144675.

* cited by examiner

MOBILE ROBOT APPARATUS

CROSS-REFERENCE TO RELATED APPLICATION

This application is a by-pass continuation application of International Application No. PCT/KR2021/008303, filed on Jun. 30, 2021, which is based on and claims priority to Korean Patent Application No. 10-2020-0087366, filed on Jul. 15, 2020, and Korean Patent Application No. 10-2020-014675, filed on Nov. 2, 2020, in the Korean Intellectual Property Office, the disclosures of which are incorporated by reference herein in their entireties.

BACKGROUND

1. Field

The disclosure relates to a mobile robot apparatus, and more particularly, to a mobile robot apparatus which can travel stably and collect information as a body travels contacting with a surface, or travels spaced apart from the surface.

2. Description of Related Art

With developments in robot technology, robots are not only found in specialized academic fields or industrial fields which require mass scale labor, but they are also becoming more common in average homes. In addition, robots are not only being supplied to perform a function at a fixed position, but mobile robots are also being supplied that are capable of traveling. Among the mobile robots, two wheeled robots with two wheels have an advantage of taking up a small surface area, and two wheeled robots of various types (Segway, Ninebot, etc.) are widely utilized.

In the related art, two wheeled robots are configured such that a center of mass of the body is always above a rotational axis of a wheel relative to the surface on which the robot may travel upon, and a balancing control is carried out so as to prevent the robot from falling. The mobile robots embodying this structure have a problem in that they are susceptible to swaying according to a rotational inertial force which can make it difficult to stably travel, and this instability further prevents such robots from being able to return to their original position when having fallen.

SUMMARY

Provided is a mobile robot apparatus which can travel stably and collect information as a body travels contacting with a surface, or travels spaced apart from the surface Additional aspects will be set forth in part in the description which follows and, in part, will be apparent from the description, or may be learned by practice of the presented embodiments.

According to an aspect of the disclosure, a mobile robot apparatus may include: a body; a first wheel disposed at a first side surface of the body; a second wheel disposed at a second side surface of the body opposite to the first side surface; a first drive device configured to provide a driving force to each of the first wheel and the second wheel; a second drive device configured to move the body in a vertical direction relative to at least one of a first center axis of the first wheel and a second center axis of the second wheel; and a processor configured to control the second drive device to move the body to contact a surface on which the mobile robot apparatus is disposed, or move the body away from the surface on which the mobile robot apparatus is disposed.

The first drive device may include: a first motor configured to provide a first driving force to the first wheel, and a second motor configured to provide a second driving force to the second wheel.

The second drive device may include a rack provided in at least one of the first wheel and the second wheel, and a pinion provided in the body and engaged with the rack.

The rack may be arranged vertically relative to the surface on which the mobile robot apparatus is disposed.

The rack may include: a first rack provided in the first wheel; and a second rack provided in the second wheel, and the pinion may include: a first pinion engaged with the first rack, and a second pinion engaged with the second rack.

The second drive device further may include: a third motor configured to rotate the first pinion, and a fourth motor configured to rotate the second pinion.

The first wheel may include: a rotatable first wheel cover; and a first intermediate member provided between the first wheel cover and the body, the second wheel may include: a rotatable second wheel cover; and a second intermediate member provided between the second wheel cover and the body, the first rack may be provided on the first intermediate member, and the second rack may be provided on the second intermediate member.

The mobile robot apparatus may further include a guide rail provided in at least one of the first intermediate member and the second intermediate member, and the body further may include a block configured to be movable along the guide rail.

The guide rail may be oriented vertically relative to the surface on which the mobile robot apparatus is disposed.

The mobile robot apparatus may further include a camera provided at the body and configured to capture an image of a surrounding environment of the mobile robot apparatus.

The mobile robot apparatus may further include a caster provided at a bottom surface of the body and configured to be rotatable.

A rotational axis of the caster may be parallel with the first center axis of the first wheel or the second center axis the second wheel.

The processor may be further configured to control the second drive device to selectively cause the caster to come into contact with or to be spaced apart from the surface on which the mobile robot apparatus is disposed.

The processor may be further configured to control the second drive device to tilt the body in a direction to which the mobile robot apparatus is turning.

The processor may be further configured to control the second drive device, based on the body contacting the surface on which the mobile robot apparatus is disposed, to move the first and second wheels toward the body until a center of mass of the body is positioned outside a section between a contact point of the body with the surface on which the mobile robot apparatus is disposed and a contact point of the first and second wheels with the surface on which the mobile robot apparatus is disposed.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Embodiments described below are provided as examples to assist in the understanding of the disclosure, and it is to be understood that the disclosure may be variously modified and realized, differently from the embodiments described herein. In addition, accompanied drawings are not shown in its actual scale but shown with scales of some elements exaggerated to assist in the understanding of the disclosure.

Terms used in the disclosure and in the claims are general terms selected considering their function herein. However, the terms may change depending on intention, legal or technical interpretation, emergence of new technologies, and the like of those skilled in the related art. Further, in certain cases, there may be terms arbitrarily selected. With respect to these terms, the meaning of the term may be interpreted as defined in the description, and if there is no specific definition of the term, the term may be interpreted based on the overall context of the disclosure and the technical common sense of the related art.

In the disclosure, expressions such as "have," "may have," "include," "may include," or the like are used to designate a presence of a corresponding characteristic (e.g., elements such as numerical value, function, operation, or component), and not to preclude a presence or a possibility of additional characteristics. As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Further, elements necessary in describing each embodiment of the disclosure are described herein, but the disclosure is not necessarily limited thereto. Accordingly, some elements may be modified or omitted, and other elements may be added. In addition, the elements may be distributed and disposed in separate devices different from one another.

Furthermore, embodiments of the disclosure have been described in detail with reference to the accompanied drawings and descriptions described in the accompanied drawings below, it is to be understood that the disclosure is not limited by or limited to the embodiments.

Embodiments will be described in detail below with reference to the accompanied drawings.

Figure 1:
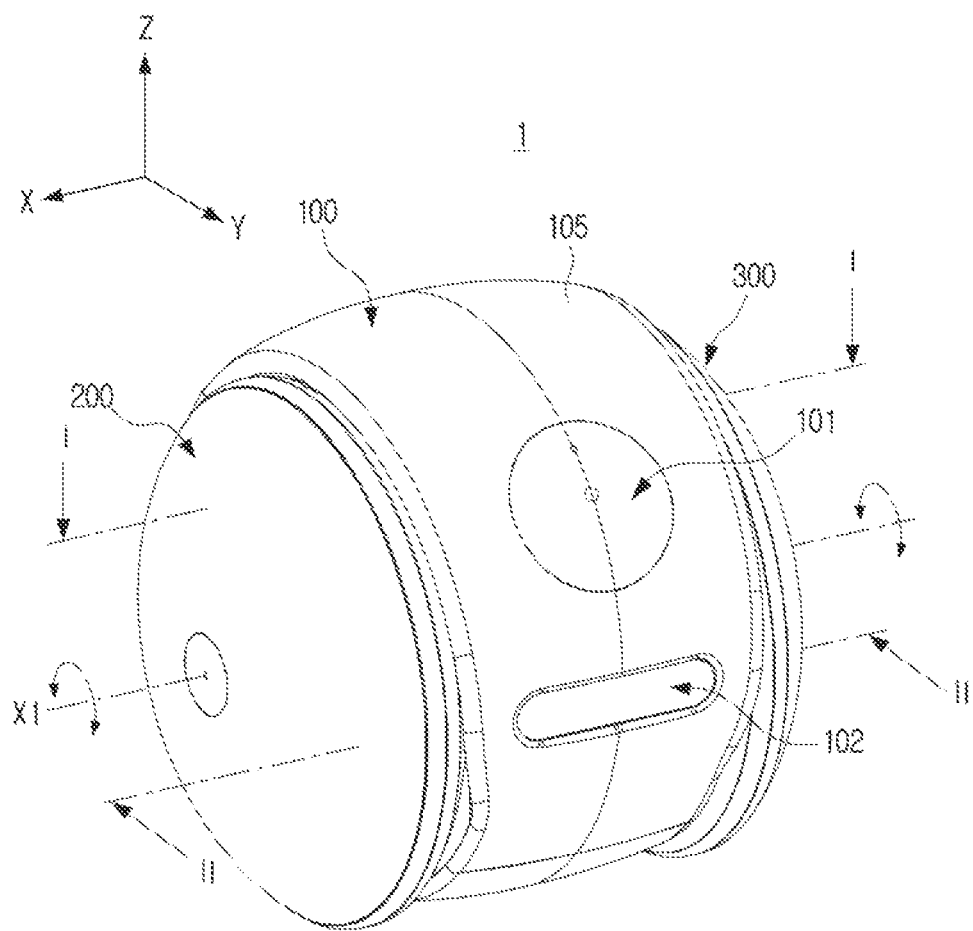
FIG. 1 is a front perspective view of a mobile robot apparatus according to an embodiment of the disclosure.
Figure 2:
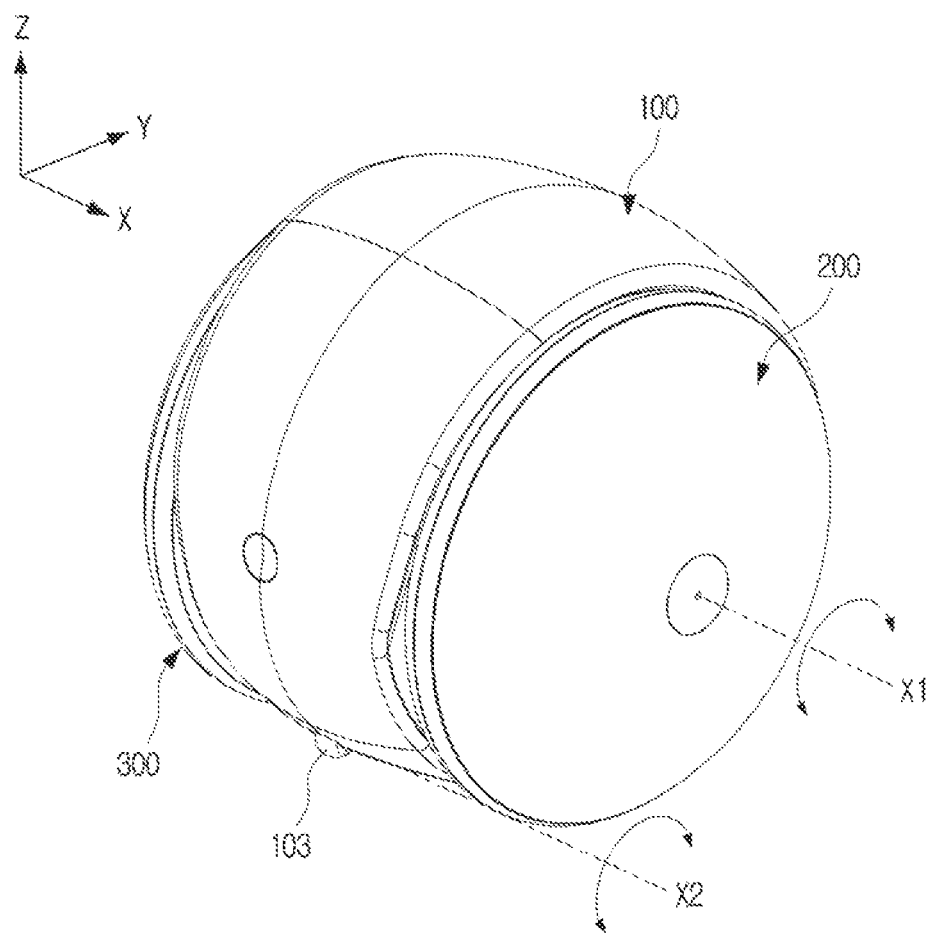
FIG. 2 is a rear perspective view of a mobile robot apparatus according to an embodiment of the disclosure.
Figure 3:
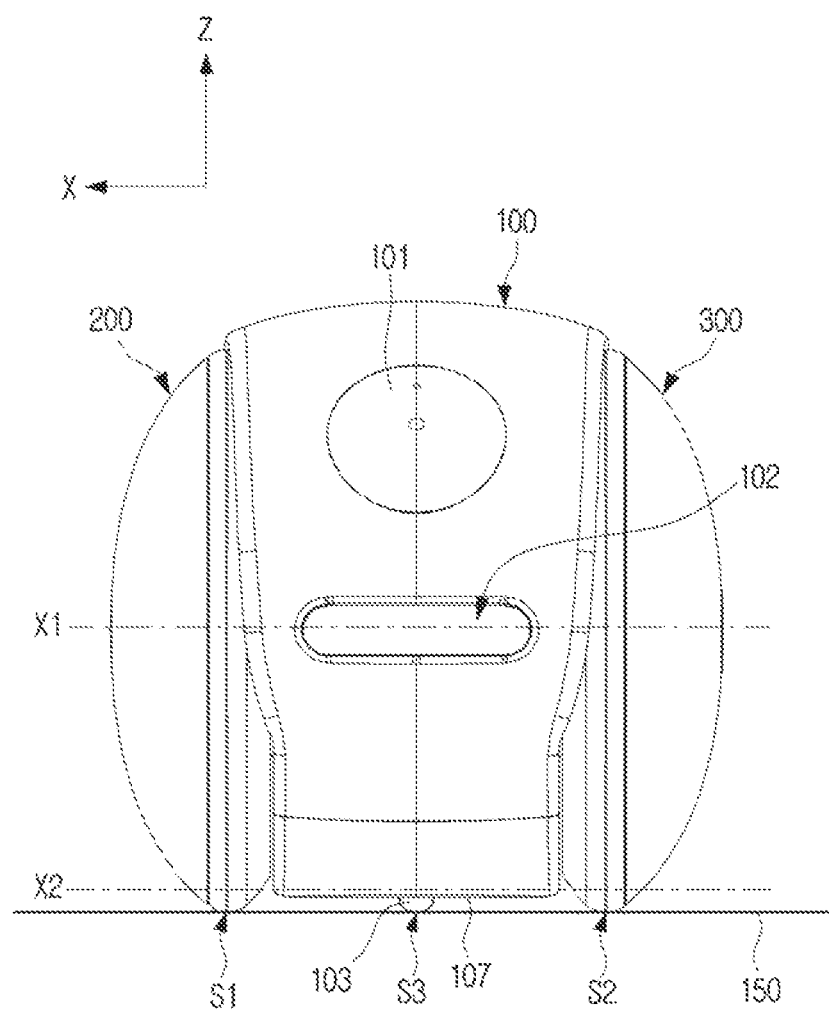
FIG. 3 is a front view of a mobile robot apparatus of which a body is in contact with a surface.

FIG. 1 is a front perspective view of a mobile robot apparatus according to an embodiment of the disclosure. FIG. 2 is a rear perspective view of the mobile robot apparatus according to an embodiment of the disclosure. FIG. 3 is a front view of a mobile robot apparatus of which a body is in contact with a surface.

A mobile robot apparatus 1 may be a device with various functions such as autonomously traveling while recognizing a surrounding environment and collecting information, delivering information to a user, and the like. The mobile robot apparatus 1 may recognize the surrounding environment based on a voice, a sound, and an image. In addition, information may be delivered to the user by controlling other electronic products through wireless communication or outputting a voice.

The mobile robot apparatus 1 may collect and analyze various information such as sounds, voices, images, and the like from the surrounding environment to make stable autonomous traveling possible. For example, the mobile robot apparatus 1 may include a microphone, a camera, a sensor, and the like to collect information on the surrounding environment.

The mobile robot apparatus 1 may physically travel by including a drive member, and through the drive member, execute various functions of the mobile robot apparatus 1 throughout the environment of the user which may include indoors and outdoors.

If the mobile robot apparatus 1 is used within a home, the mobile robot apparatus may interact with the electronic products within the home, such as a television (TV), a cleaner, and a washer, to execute a function and collect information, and to deliver the collected information to family members including a pet. Accordingly, the mobile robot apparatus may connect all members within the home with the electronic products.

The mobile robot apparatus 1 may continuously check and inspect the environment within the home even when the user is not present and connect the user with family members including a pet that needs assistance. In addition, other electronic products within the home may be checked and operated through physical travel of the mobile robot apparatus 1. Through the above, safety within the home may be sought after and security within the home may be enhanced.

The mobile robot apparatus 1 according to an embodiment of the disclosure may be implemented in a form related to the performance of a job within the home, but is not limited thereto, and may be implemented as a robot apparatus according to various embodiments.

Referring to FIGS. 1 to 3, the mobile robot apparatus 1 according to an embodiment of the disclosure may include a body 100, a first wheel 200, and a second wheel 300. Covers of the body 100, the first wheel 200, and the second wheel 300 may have a same curvature, and accordingly, an exterior of the mobile robot apparatus 1 may be formed to realize a sphere.

Although not shown in FIG. 1 to FIG. 3, a motor, a battery, an actuator, a gear, a bearing, and the like for driving the mobile robot apparatus 1 may be included inside of the body 100 of the mobile robot apparatus 1.

A camera 101 may be provided at an outer surface 105 of the body 100 to capture the surrounding environment of the mobile robot apparatus 1. In addition, a sensor 102 may be provided at the outer surface 105 of the body 100. The sensor 102 may be at least one from among an image sensor which detects an obstacle, a sound sensor which detects a voice, a temperature sensor which detects temperature, and a humidity sensor which detects humidity.

The mobile robot apparatus 1 may recognize, based on information collected from the camera 101 and from at least one sensor 102, the surrounding environment, autonomously travel and collect information, and deliver information to the user.

A caster 103 may be rotatably connected to a bottom surface 107 of body 100. A rotational axis X2 of the caster 103 may be parallel with a center axis X1 of the first and second wheels 200 and 300.

The caster 103 may be configured such that a portion of caster 103 is protruded to the outside of the bottom surface of the body 100. The caster 103 may be formed of plastic or metal, may have a rotatable ball caster form and thereby, may reduce frictional drag with the surface 150 upon which the mobile robot apparatus 1 may travel.

Each of the first and second wheels 200 and 300 may be in contact with the surface 150 from a first point S1 and a second point S2. In addition, the bottom surface 107 of the body 100, excluding the caster 103, may be spaced apart from the surface 150, and the caster 103 may be in contact with the surface 150 from a third point S3.

Accordingly, the mobile robot apparatus 1 may be supported from the first to third points S1, S2, and S3 of the surface 150 (three-point support mode). The body 100 may be in contact with the surface 150, and the center of mass of the body 100 may be positioned below the center axis X1 of the first and second wheels 200 and 300.

When the mobile robot apparatus 1 completes traveling to a specific location, the center of mass of the body 100 may travel to a point below the center axis X1 of the first and second wheels 200 and 300, and the mobile robot apparatus 1 may stop at the specific location in a stable position.

When the center of mass of the body 100 is at a point below the center axis X1 of the first and second wheels 200 and 300, the mobile robot apparatus 1 may travel stably at a low speed without swaying. In addition, the camera 101 disposed on the unswaying body 100 may accurately capture the surrounding environment of the mobile robot apparatus 1.

In addition, because there is no need for control of a second drive device 500 (see FIG. 9) that moves the body 100, which will be described below, in a vertical direction based on the center axis of the first and second wheels 200 and 300, the mobile robot apparatus 1 may efficiently travel at low energy.

The first wheel 200 and the second wheel 300 may be respectively disposed at opposite side surfaces of the body 100. The first and second wheels 200 and 300 may respectively be provided with driving force from a first drive device 400 (FIG. 6) and rotate about the center axis X1. The center axis X1 of the first and second wheels 200 and 300 may be horizontal to the surface 150.

The mobile robot apparatus 1 may travel toward a front direction or a rear direction according to the first and second wheels 200 and 300 rotating about the X1 axis, or turn to travel freely to a desired location.

Figure 4:
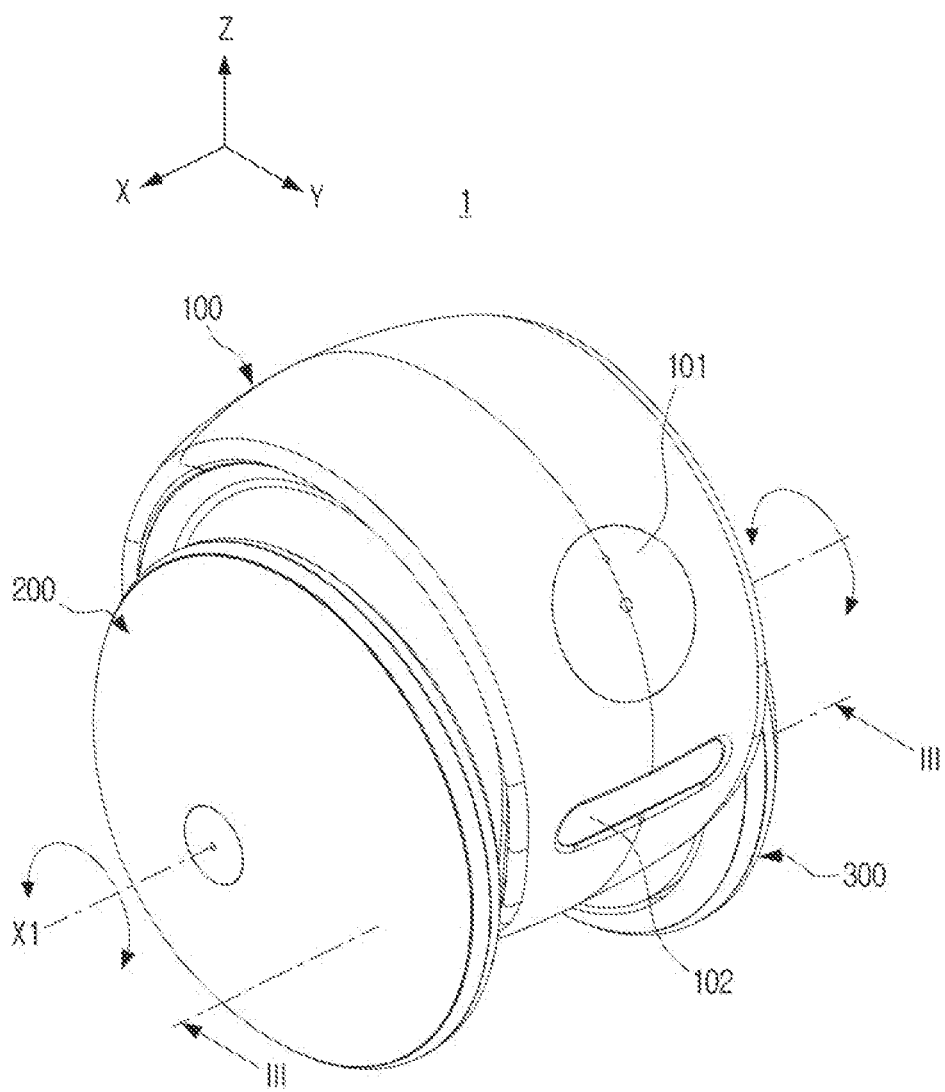
FIG. 4 is a front perspective view of a mobile robot apparatus of which a body travels to an upper side.
Figure 5:
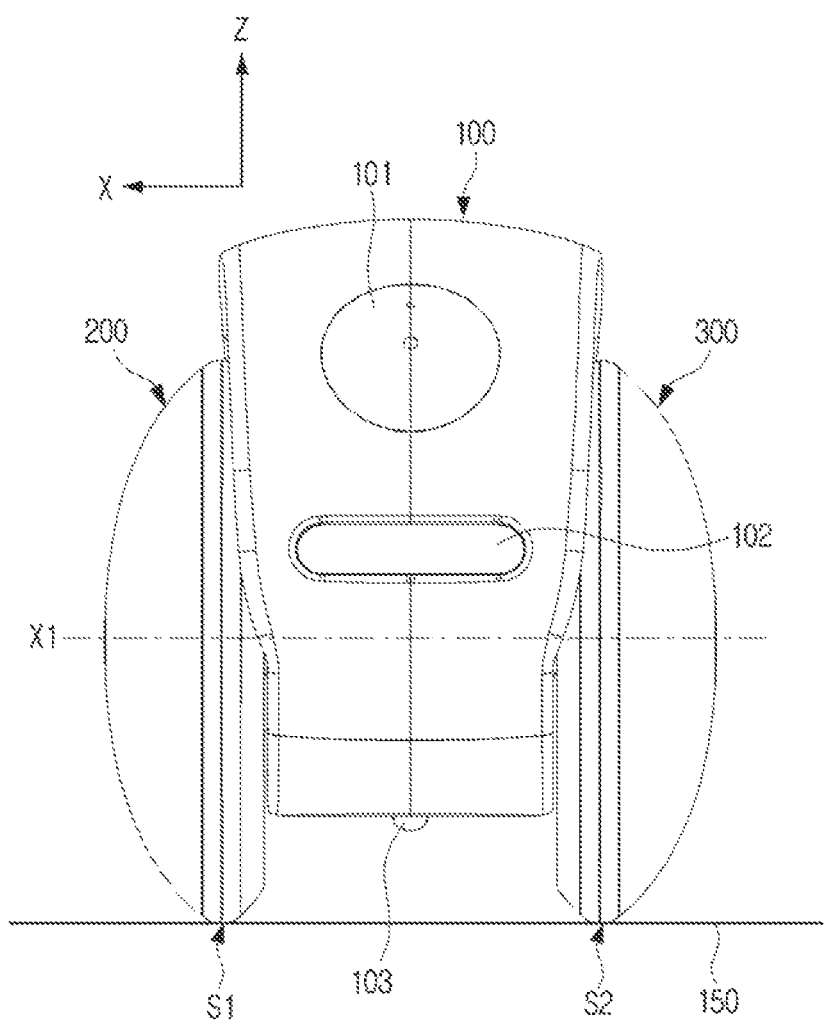
FIG. 5 is a front view of a mobile robot apparatus of which a body is spaced apart from a surface.

FIG. 4 is a front perspective view of the mobile robot apparatus where the body 100 is raised upward and away from the surface 150. FIG. 5 is a front view of the mobile robot apparatus 1 where the body 100 is raised upward and away from the surface 150.

Referring to FIG. 4 and FIG. 5, the body 100 may move in a vertical direction upward relative to the center axis X1 of the first and second wheels 200 and 300. Accordingly, a gap distance with the surface 150 may be further increased for the body 100, and the center of mass of the body 100 may be positioned above the center axis X1 of the first and second wheels 200 and 300.

That is, because both the bottom surface 107 of the body 100 and the caster 103 are not in contact with the surface 150, and only the first and second wheels 200 and 300 are in contact with the surface 150 from the first and second points S1 and S2, the mobile robot apparatus 1 may travel using the first and second points S1 and S2 of the surface 150 in a supported state (two-point support mode).

Accordingly, the body 100 may travel efficiently without the body 100 contacting the surface 150 even on surfaces with cushioning such as a carpet because sufficient clearance is secured from the surface 150. In addition, because sufficient distance to an extent of passing an obstacle between the body 100 and the surface 150 is secured, the mobile robot apparatus 1 may easily travel while avoiding collisions between the body 100 and the obstacles.

Figure 6:
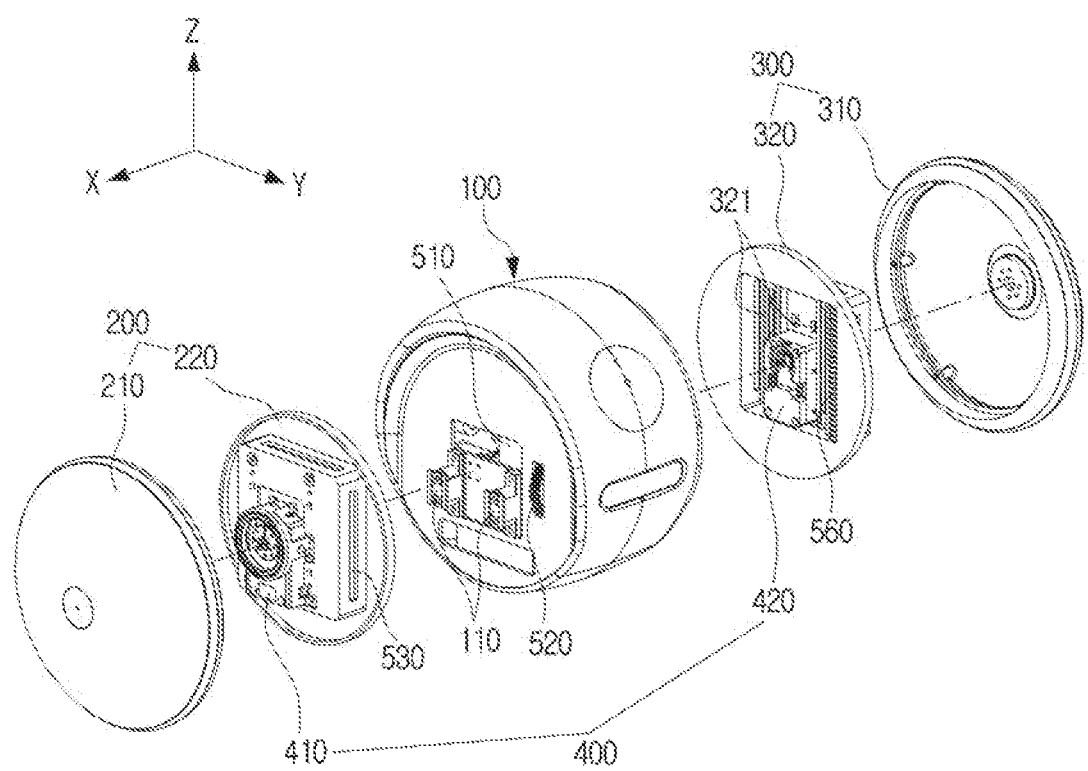
FIG. 6 is an exploded, front, perspective view of a mobile robot apparatus according to an embodiment of the disclosure.
Figure 7:
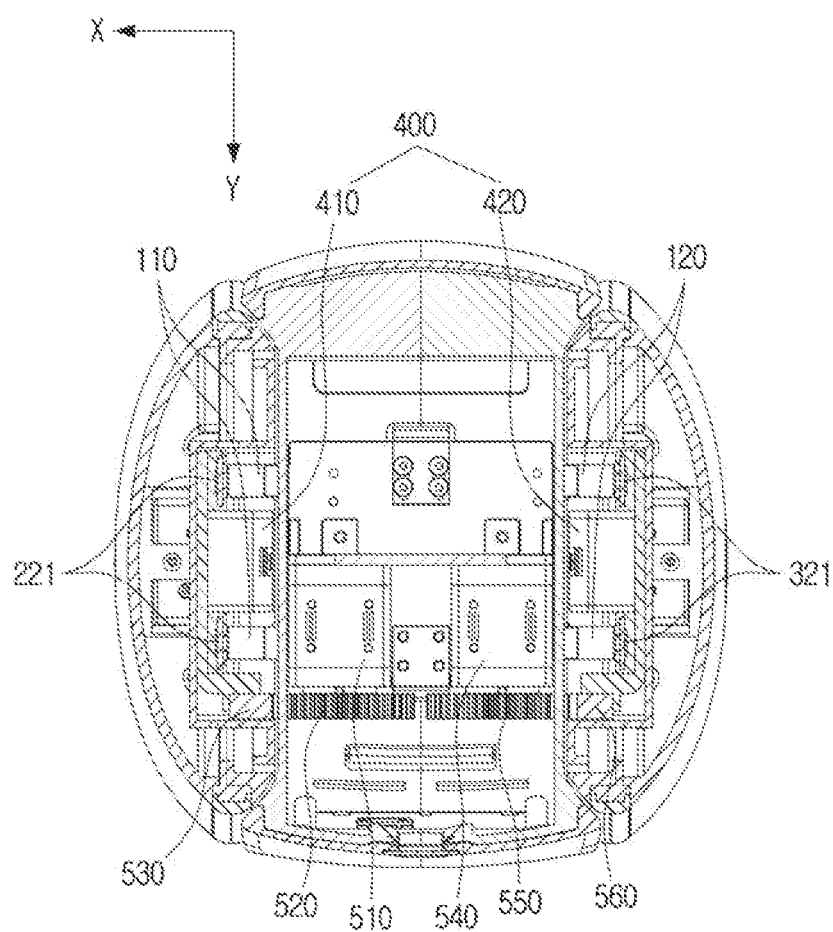
FIG. 7 is a cross-sectional view of the mobile robot apparatus shown in FIG. 1 taken along line I-I.
Figure 8:
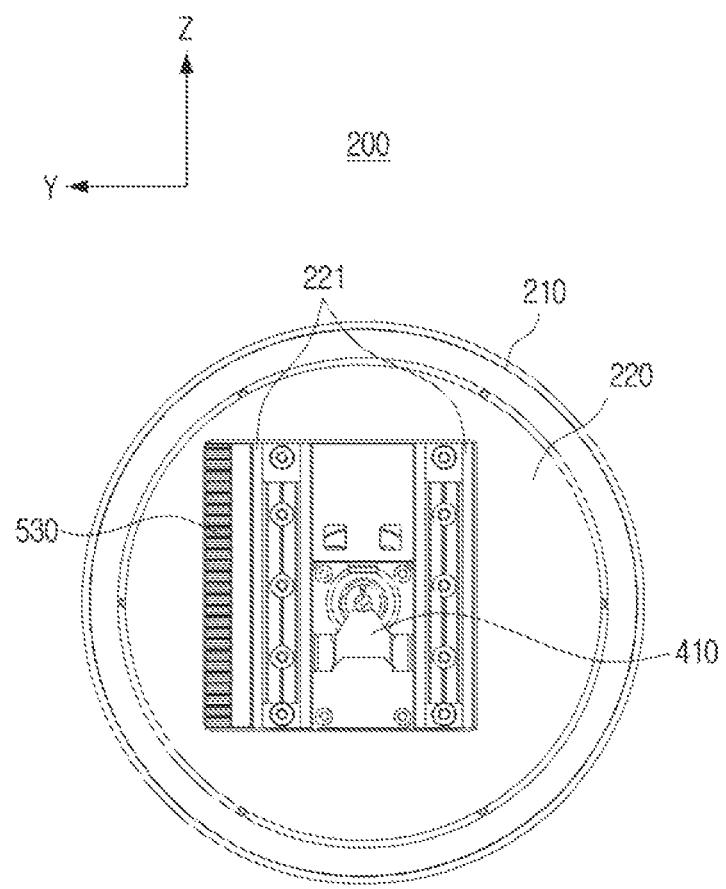
FIG. 8 is a side, interior view of a first wheel according to an embodiment of the disclosure.
Figure 9:
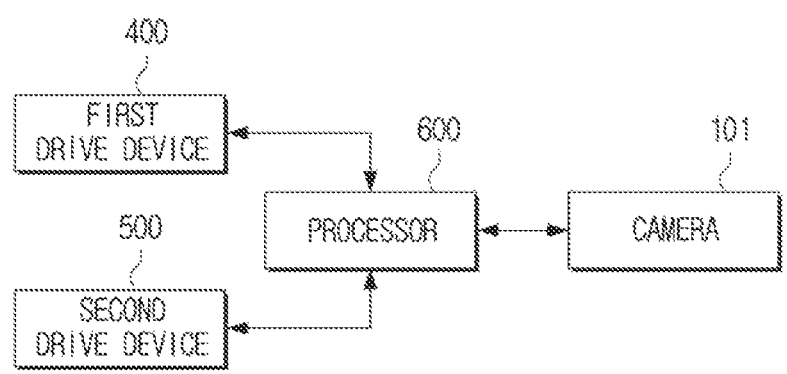
FIG. 9 is a block view schematically illustrating a control process of a mobile robot apparatus according to an embodiment of the disclosure.

FIG. 6 is an exploded perspective view of a mobile robot apparatus 1 according to an embodiment of the disclosure. FIG. 7 is a top, cross-sectional view of the mobile robot apparatus 1 shown in FIG. 1 taken along line I-I. FIG. 8 is a side view of a first wheel (viewing the interior side of the wheel which faces body 100 when the wheel is attached) according to an embodiment of the disclosure. FIG. 9 is a block view schematically illustrating a control process of the mobile robot apparatus according to an embodiment of the disclosure.

Referring to FIGS. 6 to 9, the first wheel 200 may include a first wheel cover 210 and a first intermediate member 220, and a second wheel 300 may include a second wheel cover 310 and a second intermediate member 320. In addition, the mobile robot apparatus 1 may further include the first drive device 400, the second drive device 500, and a processor 600.

The first and second wheel covers 210 and 310 may be respectively connected to the first and second intermediate members 220 and 320, which do not rotate relative to the body 100, to be rotatable relative to body 100. In addition, the body 100 may be configured such that opposite side surfaces are respectively connected to the first and second intermediate members 220 and 320 such that the intermediate members are vertically movable relative to body 100.

That is, the first and second wheel covers 210 and 310 may rotate relative to the first and second intermediate members 220 and 320, and the body 100 may move vertically relative to the first and second intermediate members 220 and 320.

The first and second intermediate members 220 and 320 may be disposed between the wheel covers 210 and 310 and the body 100, and may support the first drive device 400, racks 530 and 560, and guide rails 221 and 321.

The first drive device 400 may provide driving force to each of the first and second wheels 200 and 300. The first drive device 400 may include a first motor 410 which provides driving force to the first wheel 200 and a second motor 420 which provides driving force to the second wheel 300.

The first motor 410 may be disposed on the first intermediate member 220 and rotate the first wheel cover 210, and the second motor 420 may be disposed on the second intermediate member 320 and rotate the second wheel cover 310.

The second drive device may include racks 530 and 560, which are disposed in at least one from among the first and second wheels 200 and 300, and pinions 520 and 550, which are disposed in the body 100 to engage with the racks 530 and 560.

Specifically, the second drive device 500 may include a third motor 510, a first pinion 520, and a first rack 530. The first pinion 520 may be disposed in the body 100 to engage with the first rack 530, and the first rack 530 may be disposed in the first wheel 200.

When the third motor 510 rotates the first pinion 520, the first pinion 520 may move along the first rack 530. Accordingly, the body 100 may move vertically relatively to the first wheel 200.

In addition, the second drive device 500 may include a fourth motor 540, a second pinion 550, and a second rack 560. The second pinion 550 may be disposed in the body 100 to engage with the second rack 560, and the second rack 560 may be disposed in the second wheel 300.

When the fourth motor 540 rotates the second pinion 550, the second pinion 550 may move along the second rack 560. Accordingly, the body 100 may move vertically relative to the second wheel 300.

The first and second racks 530 and 560 may be vertically disposed relative to surface 150. Accordingly, the body 100 may move in a vertical direction relative to the surface 150 and to the center axis X1 of the first and second wheels 200 and 300.

In addition, the first and second racks 530 and 560 may be respectively disposed at the first and second intermediate members 220 and 320. Accordingly, because the first and second racks 530 and 560 maintain a certain shape regardless of the rotation of the first and second wheel covers 210 and 310, the body 100 may stably move vertically relative to the first and second intermediate members 220 and 320.

As described above, as the second drive device includes two pairs of motors 510 and 540, pinions 520 and 550, and racks 530 and 560, the body 100 may stably move vertically, and when the mobile robot apparatus 1 is turned, the body 100 may be tilted and an overturning of the body 100 may be prevented as is described below in reference to FIG. 12 and FIG. 13.

In addition, the mobile robot apparatus 1 may further include guide rails 221 and 321 which are disposed in at least one from among the first and second intermediate members 220 and 320, and the body 100 may include blocks 110 and 120 which are moveable along the guide rails 221 and 321 at a side surface.

Specifically, a first guide rail 221 may be disposed at the first intermediate member 220 and a second guide rail 321 may be disposed at the second intermediate member 320. The first and second guide rails 221 and 321 may be vertically disposed relative to surface 150.

In addition, the body 100 may include a first block 110 which is moveable along the first guide rail 221 at one side surface and a second block 120 which is moveable along the second guide rail 321 at the other side surface.

As the first and second blocks 110 and 120 of the body 100 are respectively joined to the first and second guide rails 221 and 321 and moved, the body 100 may move vertically relative to the first and second intermediate members 220 and 320. In addition, because the first and second guide rails 221 and 321 guide a movement pathway of the body 100, the body 100 may move vertically more stably.

The mobile robot apparatus 1 may include the processor 600 for controlling an operation of the mobile robot apparatus 1, and include a sensor 102 for recognizing the surrounding environment and a communication device for communicating with other electronic devices.

The processor 600 may control the overall operation of the mobile robot apparatus 1. To this end, the processor may include one or more from among a central processing unit (CPU), an application processor (AP), or a communication processor (CP). The processor may be a micro control unit (MCU).

The processor 600 may operate an operating system or an application to control hardware or software elements connected to the processor 600, and may perform various data processing and calculations. In addition, the processor 600 may load and process commands or data received from at least one from among other elements on a volatile memory, and store various data in a non-volatile memory.

The processor 600 may receive surrounding environment information of the mobile robot apparatus 1 received from the camera 101 and at least one sensor 102, and control the first drive device 400 and the second drive device 500 based on the received information. Descriptions of the processor 600 controlling the first and second drive devices 400 and 500 will be described in detail below.

Figure 10:
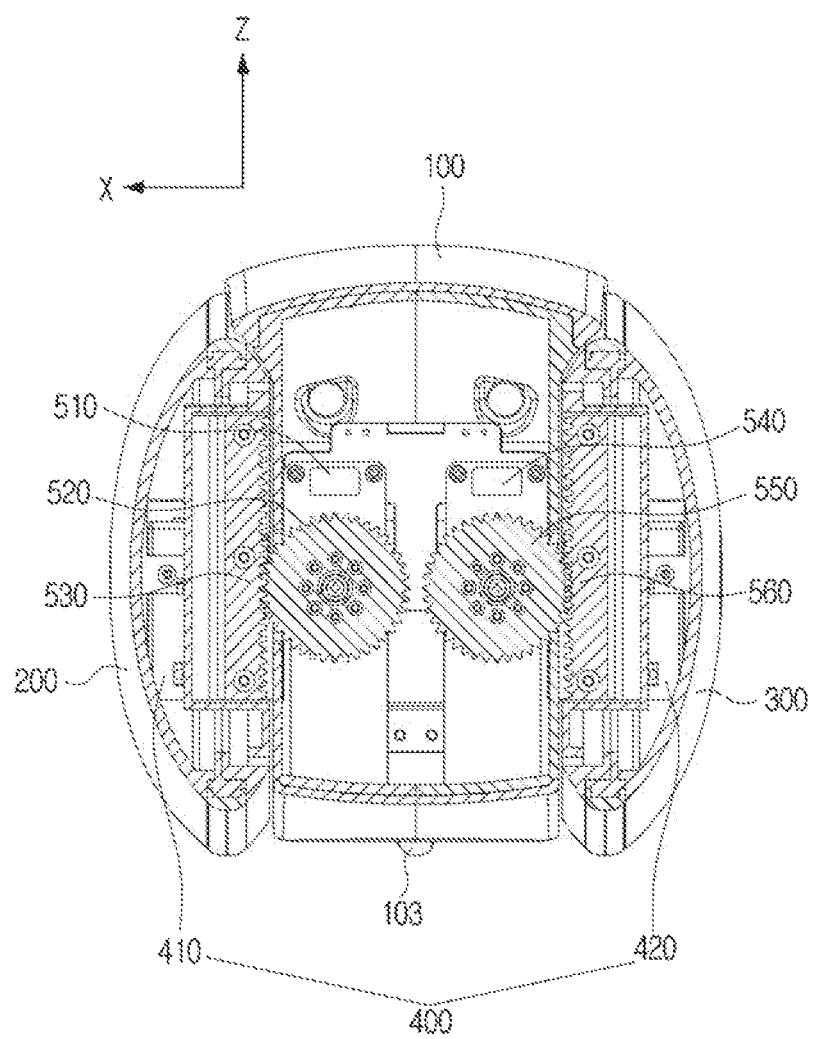
FIG. 10 is a cross-sectional view of the mobile robot apparatus shown in FIG. 1 taken along line II-II.
Figure 11:
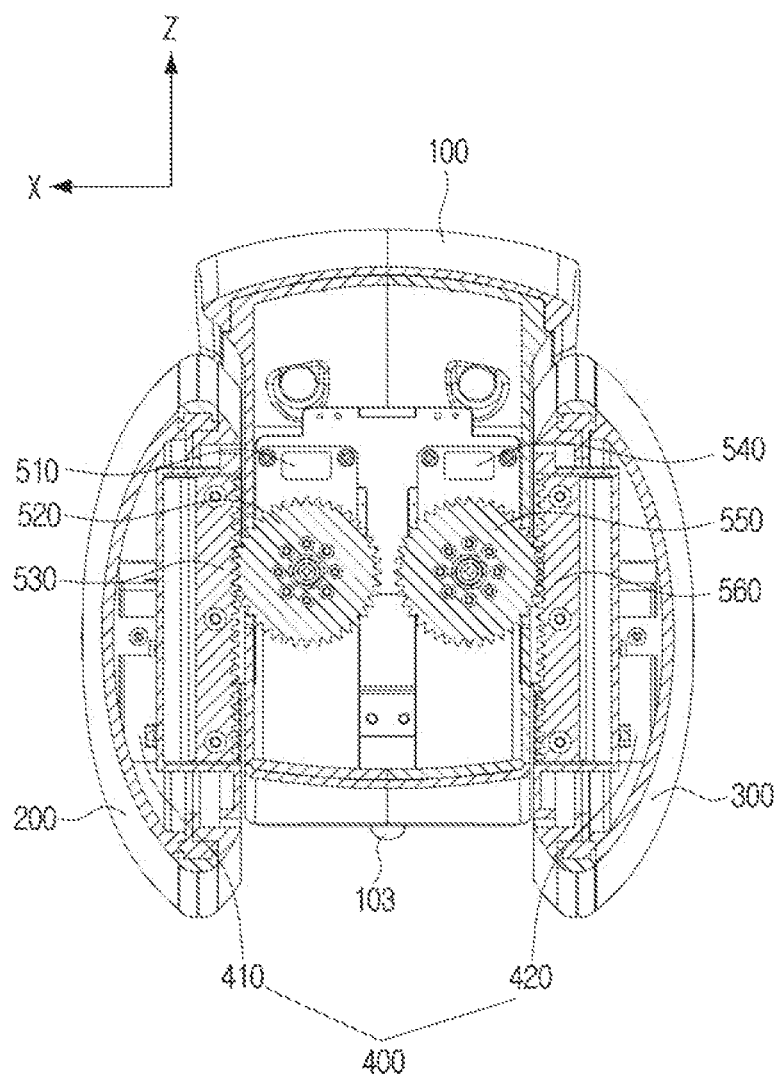
FIG. 11 is a cross-sectional view of the mobile robot apparatus shown in FIG. 4 taken along line III-III.

FIG. 10 is a front, cross-sectional view of the mobile robot apparatus 1 shown in FIG. 1 taken along line II-II. FIG. 11 is a front, cross-sectional view of the mobile robot apparatus 1 shown in FIG. 4 taken along line III-III.

Referring to FIG. 10 and FIG. 11, when the mobile robot apparatus 1 is required to travel at high speed, or is required to avoid obstacles, the processor 600 may control the second drive device 500 for the body 100 to move body 100 up relative to the center axis of the first and second wheels 200 and 300. In addition, the processor 600 may control the second drive device 500 for the caster 103 to be selectively in contact with the surface 150 or to be spaced apart from the surface 150.

Specifically, the processor 600 may control the third and fourth motors 510 and 540 for the first pinion 520 to rotate in a first direction (counter-clockwise direction in FIG. 11), and the second pinion 550 to rotate in a second direction (clockwise direction in FIG. 11) which is opposite from the first direction.

Accordingly, because the first and second pinions 520 and 550 respectively rotate to move upward along the first and second racks 530 and 560, the body 100 may also move upward relative to the center axis of the first and second wheels 200 and 300.

Figure 12:
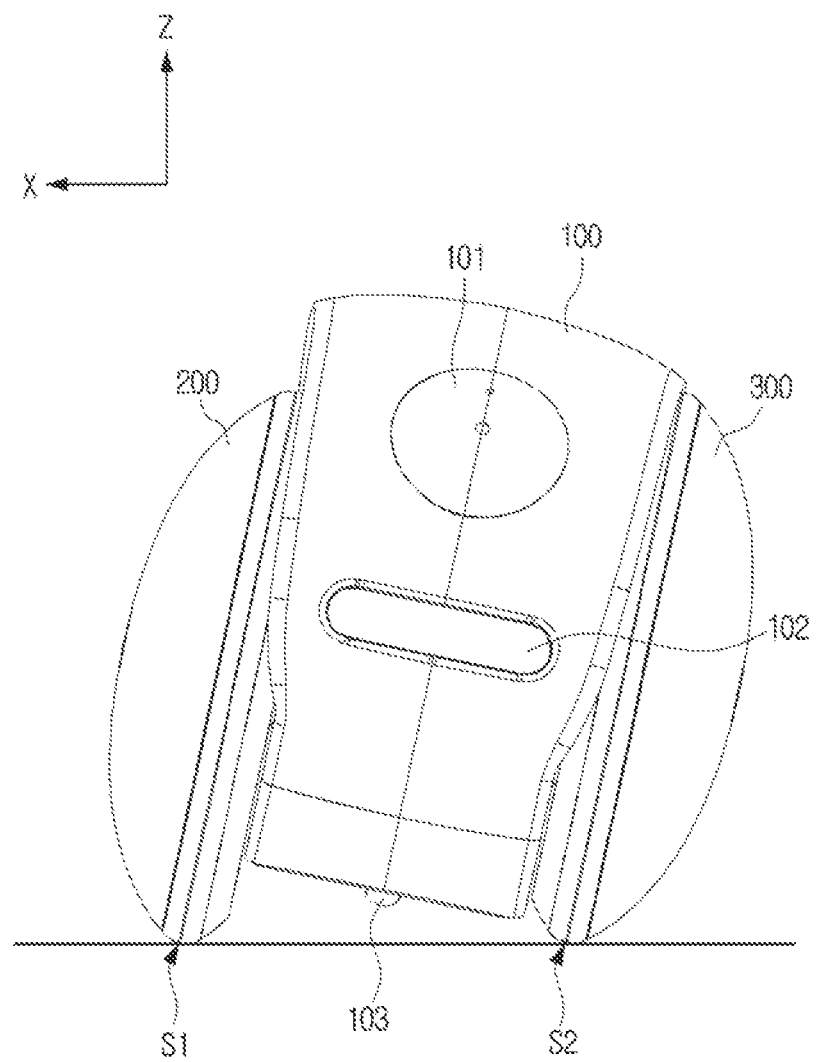
FIG. 12 and FIG. 13 are views illustrating a body being tilted when a mobile robot apparatus is turned.
Figure 13:
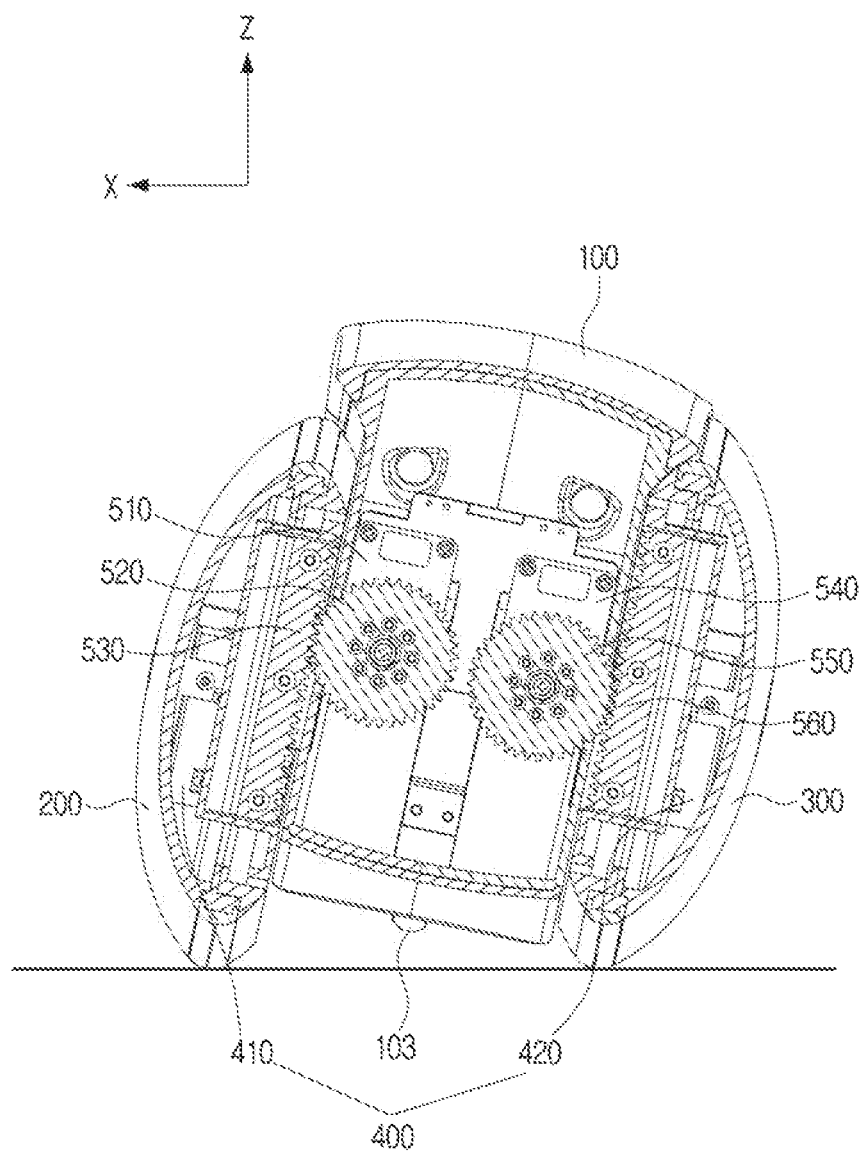

FIG. 12 and FIG. 13 are views illustrating a body 100 being tilted when the mobile robot apparatus 1 is turned. Referring to FIG. 12 and FIG. 13, the processor 600 may control the second drive device 500 for the body 100 to be tilted in a direction to which the mobile robot apparatus 1 is turned.

For example, when the mobile robot apparatus 1 is turned to a front left side, the processor 600 may control the third and fourth motors 510 and 540 such that the first pinion 520 rotates in the first direction (counter-clockwise direction in FIG. 11), and the second pinion 550 does not rotate. However, the control process of the processor 600 is not limited thereto, and the processor 600 may control the third and fourth motors 510 and 540 for the first and second pinions 520 and 550 to rotate in opposite directions from each other so as to tilt the body 100 at a greater angle.

Accordingly, because the first pinion 520 moves to the upper side relative to the first rack 530, the body 100 may be tilted in a direction to which the mobile robot apparatus 1 is turned (−X direction in FIG. 13). That is, because the body 100 is tilted in an opposite direction from a centrifugal force based on turning, the overturning of the mobile robot apparatus 1 may be prevented.

Figure 14:
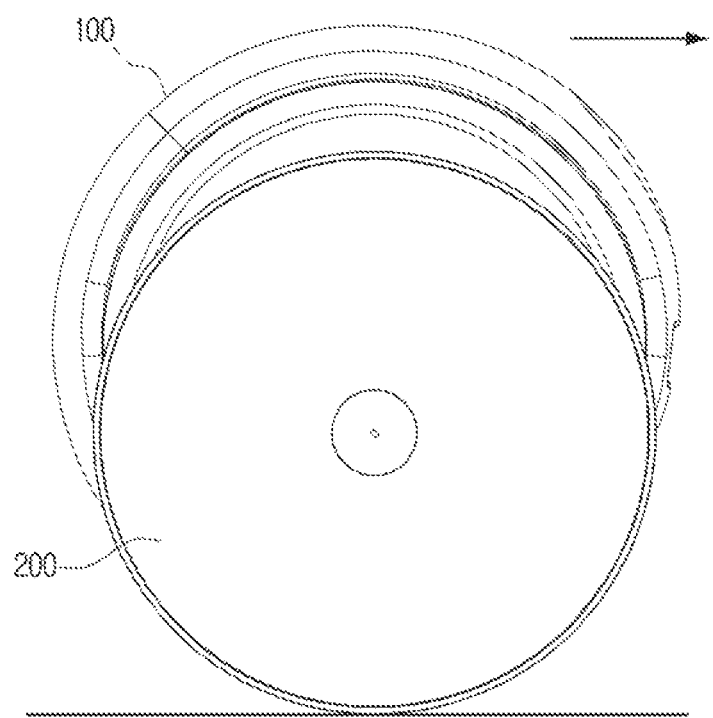
FIG. 14 to FIG. 17 are views illustrating a process of a body returning to its original position when having fallen.
Figure 15:
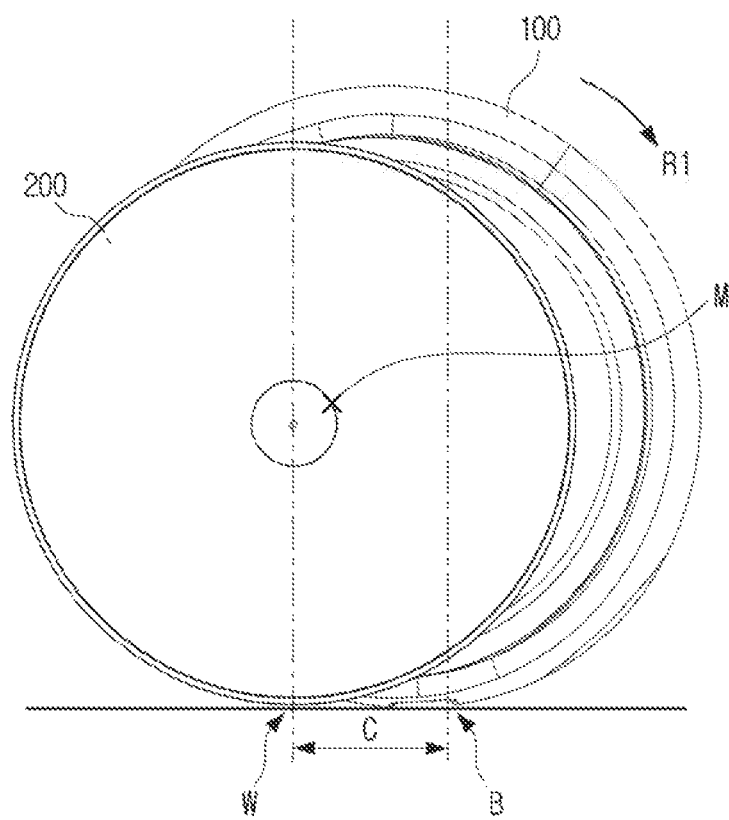
Figure 16:
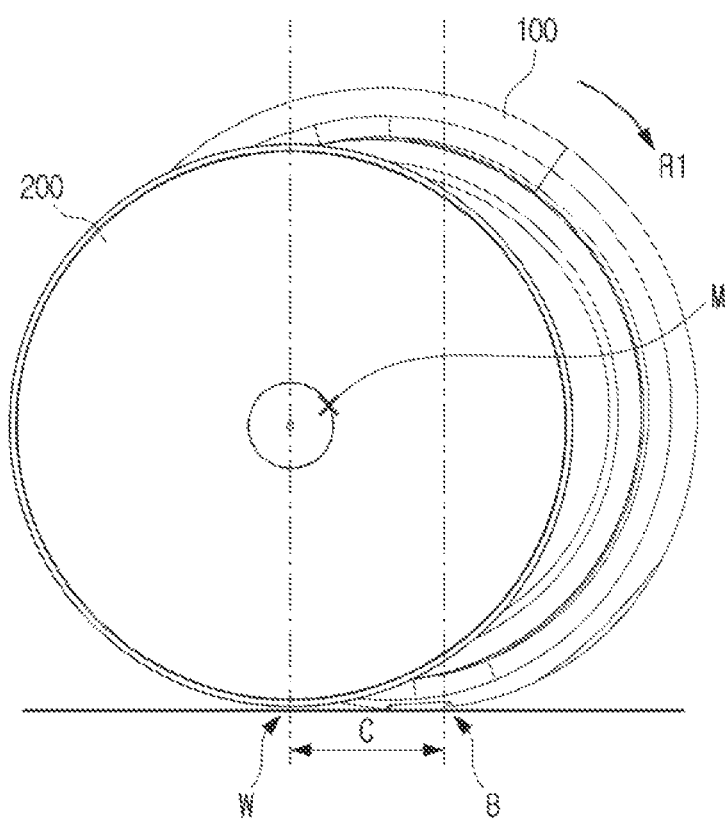
Figure 17:
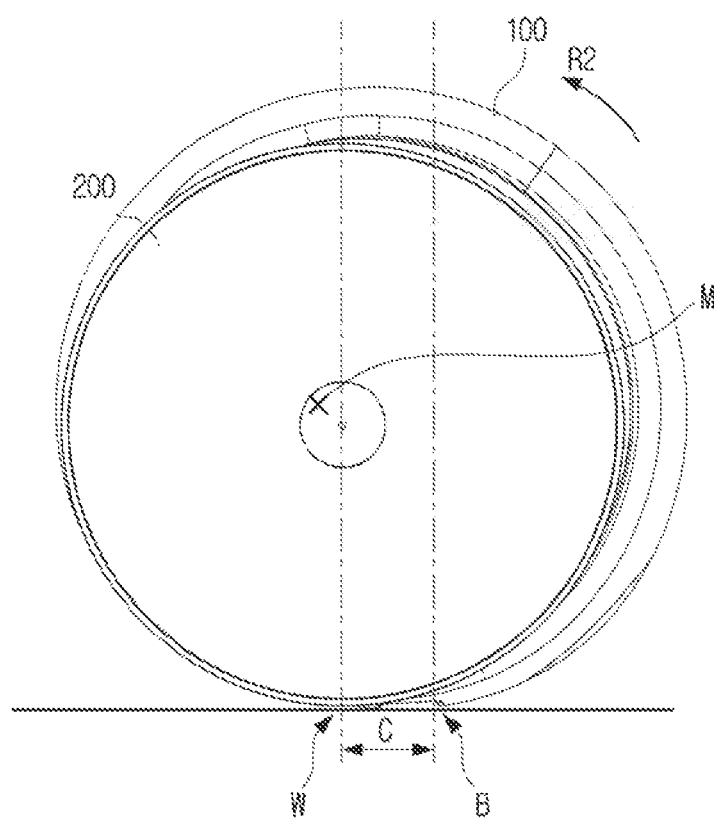

FIGS. 14, 15, and 16 are views illustrating a process of the body 100 returning to its original position when having fallen.

Referring to FIGS. 14 to 16, based on the body 100 falling as it rotates in a first direction R1 while the mobile robot apparatus 1 is moving in the two-point support mode described above, the body 100 may be in contact with the surface 150 from a first contact point B. At this time, the first and second wheels 200 and 300 may be in contact with the surface from a second contact point W.

The processor 600 may control the second drive device 500 for the center axis X1 of the first and second wheels 200 and 300 to move toward the center of body 100 until the center of mass M of the body 100 is positioned outside of a section C between the first contact point B of the body 100 and the second contact point W of the first and second wheels 200 and 300.

Specifically, the body 100 may be stopped in its place, and the center axis X1 of the first and second wheels 200 and 300 may move in a direction toward the center of mass M of body 100. Accordingly, as the second contact point W of the first and second wheels 200 and 300 becomes closer with the first contact point B of the body 100, the center of mass M of the body 100 may be positioned outside of the section C between the first and second contact points B and W.

The body 100 may be applied with a restoring torque in the second direction R2 that is opposite from the first direction R1 to which the body fell by gravity which acts on the center of mass M positioned at the outside of the contact section C based on the contact section C. Accordingly, the mobile robot apparatus 1 may again return to its position prior to falling as shown in FIG. 14.

The above-described control process is based on the scenario wherein body 100 falls in the first direction R1 toward the "front" direction, but the direction to which the body 100 falls is not limited thereto, and may fall toward the rear direction. Even when the body 100 falls toward the rear direction, the above-described control process may be identically applied, and the mobile robot apparatus 1 may return to its position prior to falling.

While example embodiments of the disclosure have been illustrated and described, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A mobile robot apparatus comprising:
a body;
a first wheel provided at a first side surface of the body;
a second wheel provided at a second side surface of the body opposite to the first side surface;
a first drive device configured to provide a driving force to each of the first wheel and the second wheel;
a second drive device comprising a rack in at least one of the first wheel and the second wheel and a pinion in the body and engaged with the rack, wherein the second drive device is configured to move the body in a vertical direction relative to at least one of a first center axis of the first wheel and a second center axis of the second wheel by rotating the pinion; and
at least one processor configured to, individually or collectively, control the second drive device to move the body to contact a surface on which the mobile robot apparatus is disposed, or move the body away from the surface on which the mobile robot apparatus is disposed.

2. The mobile robot apparatus of claim 1, wherein the first drive device comprises:
a first motor configured to provide a first driving force to the first wheel, and
a second motor configured to provide a second driving force to the second wheel.

3. The mobile robot apparatus of claim 1, wherein the rack is arranged vertically relative to the surface on which the mobile robot apparatus is disposed.

4. The mobile robot apparatus of claim 1,
wherein the rack comprises:
a first rack provided in the first wheel; and
a second rack provided in the second wheel, and
wherein the pinion comprises:
a first pinion engaged with the first rack, and
a second pinion engaged with the second rack.

5. The mobile robot apparatus of claim 4, wherein the second drive device further comprises:
a third motor configured to rotate the first pinion, and
a fourth motor configured to rotate the second pinion.

6. The mobile robot apparatus of claim 4,
wherein the first wheel comprises:
a rotatable first wheel cover; and
a first intermediate member provided between the rotatable first wheel cover and the body,
wherein the second wheel comprises:
a rotatable second wheel cover; and a second intermediate member provided between the rotatable second wheel cover and the body,
wherein the first rack is provided on the first intermediate member, and
wherein the second rack is provided on the second intermediate member.

7. The mobile robot apparatus of claim 6, further comprising:
a guide rail provided in at least one of the first intermediate member and the second intermediate member,
wherein the body further comprises a block configured to be movable along the guide rail.

8. The mobile robot apparatus of claim 7, wherein the guide rail is oriented vertically relative to the surface on which the mobile robot apparatus is disposed.

9. The mobile robot apparatus of claim 1, further comprising:
a camera provided at the body and configured to capture an image of a surrounding environment of the mobile robot apparatus.

10. The mobile robot apparatus of claim 1, further comprising:
a caster provided at a bottom surface of the body and configured to be rotatable.

11. The mobile robot apparatus of claim 10, wherein a rotational axis of the caster is parallel with the first center axis of the first wheel or the second center axis the second wheel.

12. The mobile robot apparatus of claim 10, wherein the at least one processor is further configured to, individually or collectively, control the second drive device to selectively cause the caster to come into contact with or to be spaced apart from the surface on which the mobile robot apparatus is disposed.

13. The mobile robot apparatus of claim 1, wherein the at least one processor is further configured to, individually or collectively, control the second drive device to tilt the body in a direction to which the mobile robot apparatus is turning.

14. The mobile robot apparatus of claim 1, wherein the at least one processor is further configured to, individually or collectively, control the second drive device, based on the body contacting the surface on which the mobile robot apparatus is disposed, to move the first and the second wheels toward the body until a center of mass of the body is positioned outside a section between a contact point of the body with the surface on which the mobile robot apparatus is disposed and a contact point of the first and the second wheels with the surface on which the mobile robot apparatus is disposed.

* * * * *